United States Patent
Jozaki et al.

(10) Patent No.: US 7,037,235 B2
(45) Date of Patent: May 2, 2006

(54) SPEED CHANGE RATIO CONTROL UNIT FOR CONTINUOUSLY VARIABLE TRANSMISSION

(75) Inventors: Tateki Jozaki, Kanagawa-ken (JP); Shigeru Ishii, Kanagawa-ken (JP); Tatsuo Wakahara, Kanagawa-ken (JP); Masahiro Yamamoto, Kanagawa-ken (JP); Hiroyasu Tanaka, Kanagawa-ken (JP); Shigeki Shimanaka, Kanagawa-ken (JP); Midori Yamaguchi, Kanagawa-ken (JP)

(73) Assignee: JATCO Ltd, (JP)

( * ) Notice: Subject to any disclaimer, the term of this patent is extended or adjusted under 35 U.S.C. 154(b) by 0 days.

(21) Appl. No.: 10/670,393

(22) Filed: Sep. 26, 2003

(65) Prior Publication Data

US 2004/0110599 A1    Jun. 10, 2004

(30) Foreign Application Priority Data

Sep. 30, 2002  (JP) .............................. 2002-287900

(51) Int. Cl.
    *B60K 41/12*    (2006.01)

(52) U.S. Cl. ............................ 477/44; 477/45; 477/46; 477/47; 477/48

(58) Field of Classification Search .................. 477/44, 477/45, 46, 47, 48
See application file for complete search history.

(56) References Cited

U.S. PATENT DOCUMENTS

| | | | | |
|---|---|---|---|---|
| 4,735,113 | A | * | 4/1988 | Yamamuro et al. ............ 477/38 |
| 4,829,433 | A | * | 5/1989 | Nakano et al. ................ 701/51 |
| 4,862,771 | A | * | 9/1989 | Kumura et al. ................ 477/47 |
| 4,916,982 | A | | 4/1990 | Suzuki |
| 5,607,373 | A | | 3/1997 | Ochiai et al. |
| 5,782,719 | A | | 7/1998 | Adachi |
| 5,788,599 | A | * | 8/1998 | Adachi et al. ................. 477/45 |
| 6,801,844 | B1 | * | 10/2004 | Kawamura et al. ........... 701/51 |
| 2004/0116245 | A1 | * | 6/2004 | Yamamoto et al. ............ 477/46 |

FOREIGN PATENT DOCUMENTS

| | | |
|---|---|---|
| EP | 0 870 945 A1 | 10/1998 |
| EP | 0 870 951 A | 10/1998 |
| JP | 09-144861 | 6/1997 |
| JP | 11-082701 | 3/1999 |
| JP | 2001-116131 | 4/2001 |

OTHER PUBLICATIONS

EPO Search Report, dated Aug. 26, 2005.

* cited by examiner

*Primary Examiner*—Charles A. Marmor
*Assistant Examiner*—David D. Le
(74) *Attorney, Agent, or Firm*—Blank Rome LLP (57) ABSTRACT

A speed change ratio control unit for a continuously variable transmission that uses a step motor as a driving actuator of a speed change control valve that compares a variable ASTP representing a step position of the step motor and a step position BSTP of the step motor that is necessary for realizing a desired speed change ratio at every predetermined operation cycle, and if ASTP≠BSTP is satisfied determines that a step-out has occurred on the step motor.

14 Claims, 7 Drawing Sheets

SPEED CHANGE RATIO CONTROL UNIT FOR CONTINUOUSLY VARIABLE TRANSMISSION

BACKGROUND OF THE INVENTION

The present invention relates to a speed change ratio control unit for a V-belt type continuously variable transmission and a toroidal type of continuously variable transmission (in this specification, these are named generically and only referred to as "continuously variable transmission"). More particularly, in a continuously variable transmission using a step motor as the driving actuator of a speed control valve, the invention relates to a speed change ratio control unit which provides preventive measures against step-out of the concerned step motor.

In the case of a V-belt type continuously variable transmission, by hydraulically changing the diameter ratio between a pair of pulleys (a drive pulley and a driven pulley) across which a V-belt is laid; in the case of a toroidal type continuously variable transmission, by inclining power rollers hydraulically to change the contact diameter between the input and output disks, and in both cases, the speed change ratio of a vehicle such as an automobile is changed in a non-step manner.

In these continuously variable transmissions, a hydraulic pressure valve called change gear control valve is provided in order to change the diameter ratio between the pair of pulleys or in order to change the inclination amount of the power rollers. Such continuously variable transmissions which use a step motor as a driving actuator of the speed change control valve have been known.

A step motor is superior in obtaining accurate rotation angle (step position) corresponding to the number of control pulses. However, the synchronization between the control pulse and the motor revolution is sometimes lost in such cases when a sharp speed change is made or an overload is applied. Such situation described above is called "step-out."

In the continuously variable transmissions using a step motor (also, called a stepping motor) for the driving actuator of the speed change control valve, a conventional type speed change ratio control unit equipped with step-out preventive measures for the step motor is known. For example, when a switch (low switch) is provided which turns on when a spool of a speed change control valve reaches to a specific position corresponding to the maximum speed change ratio (position of maximum speed change ratio); determining whether the low switch is on or not at every predetermined control cycle; and when it is on a value of the step position (ASTP) of the step motor obtained by the operation unit is replaced with a predetermined value (LOWSTP) corresponding to the above maximum speed change ratio. This unit is described in, for example, Japanese Laid-open (Kokai) Patent Application (A) numbered Heisei 8-114260 (1996) titled "CHANGE GEAR RATIO CONTROLLER OF CONTINUOUSLY VARIABLE TRANSMISSION."

According to the above control unit, when the spool of the speed change control valve is at a specific position corresponding to the maximum speed change ratio, the low switch is turned on. Since the ASTP is replaced with the LOWSTP, a condition of "ASTP≠LOWSTP" due to a step-out can be corrected to a condition of "ASTP=LOWSTP"

SUMMARY OF THE INVENTION

Conversely, in the above described prior art, unless the low switch is turned on, i.e., unless the spool of the speed change control valve is not positioned at a specific position corresponding to the maximum speed change ratio, the step-out cannot be detected and correction thereof cannot be made. Therefore, there arises such a problem that, when the actual speed change ratio is at a speed change ratio other than the maximum speed change ratio, the control unit does not utterly serve as the step-out preventive measures.

Accordingly, an object of the invention is to provide a speed change ratio control unit for a continuously variable transmission capable of detecting and correcting the step-out at any speed, change ratio.

The invention set forth is a speed change ratio control unit for a continuously variable transmission which converts input rotation into output rotation in continuously changing speed manner through controlling a step motor as a driving actuator of a speed change control valve, and the speed change control unit is characterized in comprising: an input rotation detection means for detecting the input rotation; an output rotation detection means for detecting the output rotation; an actual speed change ratio calculation means that calculates actual speed change ratio from the input rotation detected and the output rotation detected; a step-out determination means which compares a step position (ASTP) of the step motor stored by the speed change ratio control unit and a step position (BSTP) of the step motor corresponding to the calculated actual speed change ratio at every predetermined operation cycle, and if ASTP≠BSTP is satisfied, determines that a step-out has occurred on the step motor; a step-out correction means that, when a step-out is determined by the step-out determination means, corrects the ASTP so as to reduce a difference between ASTP and BSTP; and a drive means for driving step motor using the corrected ASTP.

According to this invention, irrespective of the speed change ratio, the step-out determination and step-out correction of the step motor are made at every predetermined operation cycle. Accordingly, the step-out determination and correction can be made at any speed change ratio including the maximum speed change ratio. Conventionally, the deviation of the step motor was corrected by initializing or the like only when the vehicle has come to the state of halt with a maximum speed change ratio. Now the step-out correction became possible even during driving and since the opportunity to correct the deviation has increased and the tracking performance of the speed change ratio has been enhanced, the fuel economy improvement can be achieved.

According to this invention, the step-out determination means is characterized in determining a step-out of the step motor when a step-out determination condition that hydraulic pressure is in a state capable of realizing a speed change ratio corresponding to a step position (ASTP) of the step motor stored in the speed change control unit is satisfied, on an occasion of step-out determination. Additionally, by adding this condition, when the step motor is not in the state of step-out and the speed change ratio cannot be realized due to insufficient hydraulic pressure, it is possible to prevent the erroneous step-out determination and the misjudgment can be avoided.

According to this invention, the step-out determination means is characterized in determining a step-out of the step motor when a step-out determination condition that alteration of the speed change ratio is a predetermined value or less is satisfied, on an occasion of step-out determination.

Furthermore, according to this invention, by adding this condition it is possible to prevent the step-out determination from being made during such operation condition that the speed change ratio is apt to change easily (speed change ratio transition period) and the misjudgment can be avoided.

According to this invention, the step-out determination means is characterized in determining a step-out of the step motor when a step-out determination condition that acceleration or deceleration is a predetermined value or less is satisfied, on an occasion of step-out determination.

According to this invention, since the speed change ratio is apt to change easily during acceleration and deceleration, there is a possibility of making a misjudgment if a step-out determination is made during such speed change ratio transition period. Accordingly, by-adding this condition, it is possible to detect a stable state of the speed change ratio correctly and the misjudgment can be avoided.

According to this invention, the step-out determination means is characterized in determining a step-out of the step motor when a step-out determination condition that braking is not being operated is satisfied, on an occasion of step-out determination.

According to this invention, when accelerating or decelerating which likely requires a braking operation, the speed change ratio is apt to change easily. Hence there is a possibility of making a misjudgment if the step-out determination is made during such speed change ratio transition period. Accordingly, by adding this condition, it is possible to detect a stable state of the speed change ratio correctly and the misjudgment can be avoided.

According to this invention, the step-out determination means is characterized in determining a step-out of the step motor when a step-out determination condition that a lever is not being operated by a driver is satisfied, on an occasion of the step-out determination.

Furthermore, according to this invention, by adding this condition, it is possible to prevent the step-out determination from being made during such operation condition that the speed change ratio is being changed (speed change ratio transition period) and the misjudgment can be avoided.

According to this invention, the determination means is characterized in making the determination when all the above-mentioned conditions are satisfied.

According to this invention, by performing the step-out determination when all the conditions are satisfied, the detection accuracy is improved. Accordingly the possibility of misjudgment is further reduced.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE INVENTION

The present invention will hereinafter be described in detail with reference to the preferred embodiments shown in the accompanying drawings as an application example to a speed change ratio control unit of a V-belt type continuously variable transmission.

Figure 1:
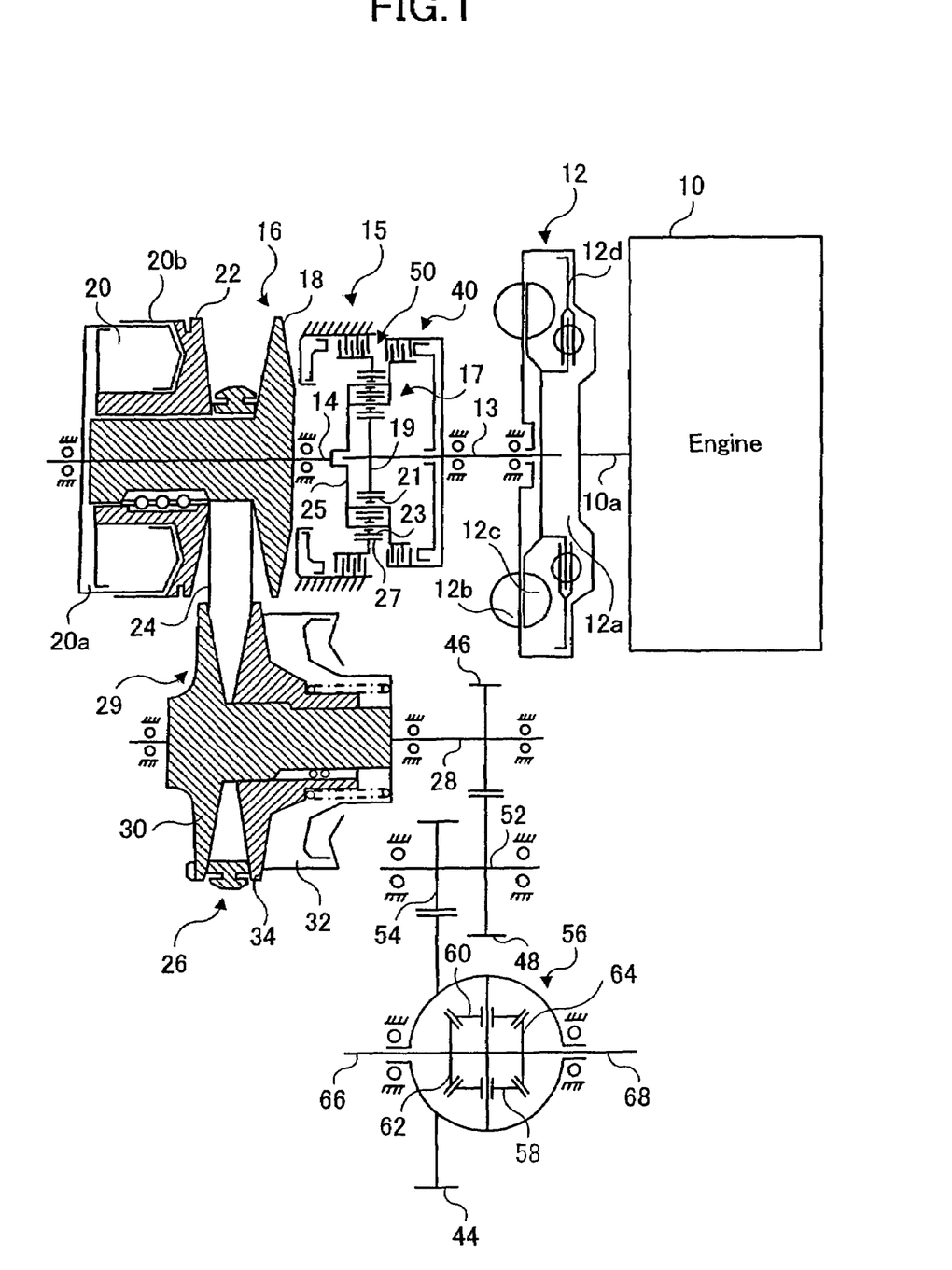
FIG. 1 is a skeleton diagram showing a power transmission mechanism of a V-belt type continuously variable automatic transmission according to an embodiment of the invention.

FIG. 1 is a skeleton diagram showing a power transmission mechanism of a V-belt type continuously variable automatic transmission according to an embodiment of the present invention. As shown in the drawing, a fluid coupling 12 is connected to an output shaft 10a of an engine 10. The fluid coupling 12 is equipped with a lock-up mechanism that enables a pump impeller 12b at the input side and a turbine liner 12c at the output side to be mechanically connected and disconnected by controlling the hydraulic pressure in a lock-up oil chamber 12a.

The output side of the fluid coupling 12 equipped with a lock-up clutch 12d is connected with a rotation axis 13, and the rotation axis 13 is connected with a forward/reverse changing mechanism 15. The forward/reverse changing mechanism 15 has a planetary gear mechanism 17, a forward clutch 40 and a reverse brake 50.

The planetary gear mechanism 17 comprises a sun gear 19, a pinion carrier 25 having two pinion gears 21 and 23 and an internal gear 27. The pinion gears 21 and 23 are meshed with each other; the pinion gear 21 is meshed with the sun gear 19; and the pinion gear 23 is meshed with the internal gear 27. The sun gear 19 is connected with the rotation axis 13 so as to always rotate integrally therewith. The pinion carrier 25 is connectable with the rotation axis 13 through the forward clutch 40. Also, the internal gear 27 is fixable to a static portion by the reverse brake 50. The pinion carrier 25 is connected with a drive axle 14 disposed on the external periphery of the rotation axis 13, and a primary pulley 16 (also referred to as drive pulley) is attached to the drive axle 14.

The primary pulley 16 is comprised of a fixed conical plate 18 that rotates integrally with the drive axle 14 and a moving conical plate 22 that is disposed being faced to the fixed conical plate 18 to form a V-shaped pulley groove and is movable in the axial direction of the drive axle 14 by a hydraulic pressure (primary pressure) which acts on a primary pulley cylinder chamber 20. The primary pulley cylinder chamber 20 is constituted of two chambers, chamber 20a and chamber 20b, and has a pressure receiving area twice as large as that of a secondary pulley cylinder chamber 32, which will be described later. The primary pulley 16 is connected with the secondary pulley 26 (also, referred to as driven pulley) in a transmissible manner by a V-belt 24.

The secondary pulley 26 is comprised of a fixed conical plate 30 that is disposed on a driven shaft 28 and rotates integrally with the driven shaft 28 and a moving conical plate 34 that is disposed being faced to the fixed conical plate 30 to form a V-shaped pulley groove and is movable in the direction of the driven shaft 28 by a hydraulic pressure (secondary pressure) which acts on the secondary pulley cylinder chamber 32. A V-belt type continuously variable automatic transmission 29 (continuously variable transmission) is comprised of the primary pulley 16, the V-belt 24 and the secondary pulley 26.

A drive gear 46 is fixed to the driven shaft 28. The drive gear 46 is meshed with an idler gear 48 on an idler shaft 52; a pinion gear 54 disposed on the idler shaft 52 is always meshed with a final gear 44. A pair of pinion gears 58 and 60 constituting a differential gear unit 56 is mounted on the final gear 44; these pinion gears 58 and 60 are meshed with a pair of side gears 62 and 64; and the side gears 62 and 64 are connected with output shafts 66 and 68 respectively.

The turning force input from the output shaft 10a of the engine 10 to a power transmission mechanism as described above is transmitted to the forward/reverse changing mechanism 15 via the fluid coupling 12 and the rotation axis 13. When the forward clutch 40 is engaged and the reverse brake 50 is released, the turning force of the rotation axis 13 is transmitted to the drive axle 14 with the same turning direction via the planetary gear mechanism 17 in a state of integrally turning therewith. On the other hand, when the forward clutch 40 is released and the reverse brake 50 is engaged, the turning force of the rotation axis 13 is transmitted to the drive axle 14 in a state that the turning direction is inversed owing to the working of the planetary gear mechanism 17.

The turning force of the drive axle 14 is transmitted to the differential gear unit 56 via the primary pulley 16, the V-belt 24, the secondary pulley 26, the driven shaft 28, the drive gear 46, the idler gear 48, the idler shaft 52, the pinion carrier 54 and the final gear 44, and the output shafts 66 and 68 rotate in the forward direction or reverse direction. When both of the forward clutch 40 and the reverse brake 50 are released, the power transmission mechanism is in the state of neutral.

When performing the above-described power transmission, it is possible to change the rotation ratio between the primary pulley 16 and the secondary pulley 26 by changing the diameter at the contact position with the V-belt 24 by shifting the moving conical plate 22 of the primary pulley 16 and the moving conical plate 34 of the secondary pulley 26 in the axial direction. For example, when the width of the V-shaped pulley groove of the primary pulley 16 (hereinafter, simply referred to as "groove width") is enlarged and the width of the V-shaped pulley groove of the secondary pulley 26 (hereinafter, simply referred to as "groove width") are reduced, the diameter at the contact position of the V-belt at the primary pulley 16 side becomes smaller and the diameter at the contact position of the V-belt at the secondary pulley 26 side becomes larger. As a result, a large speed change ratio can be obtained. Or, by shifting the moving conical plates 22 and 34 in the reversed direction, to the contrary against the above, a smaller speed change ratio can be obtained.

In the next place, the hydraulic control unit of the V-belt type continuously variable automatic transmission will be described.

Figure 2:
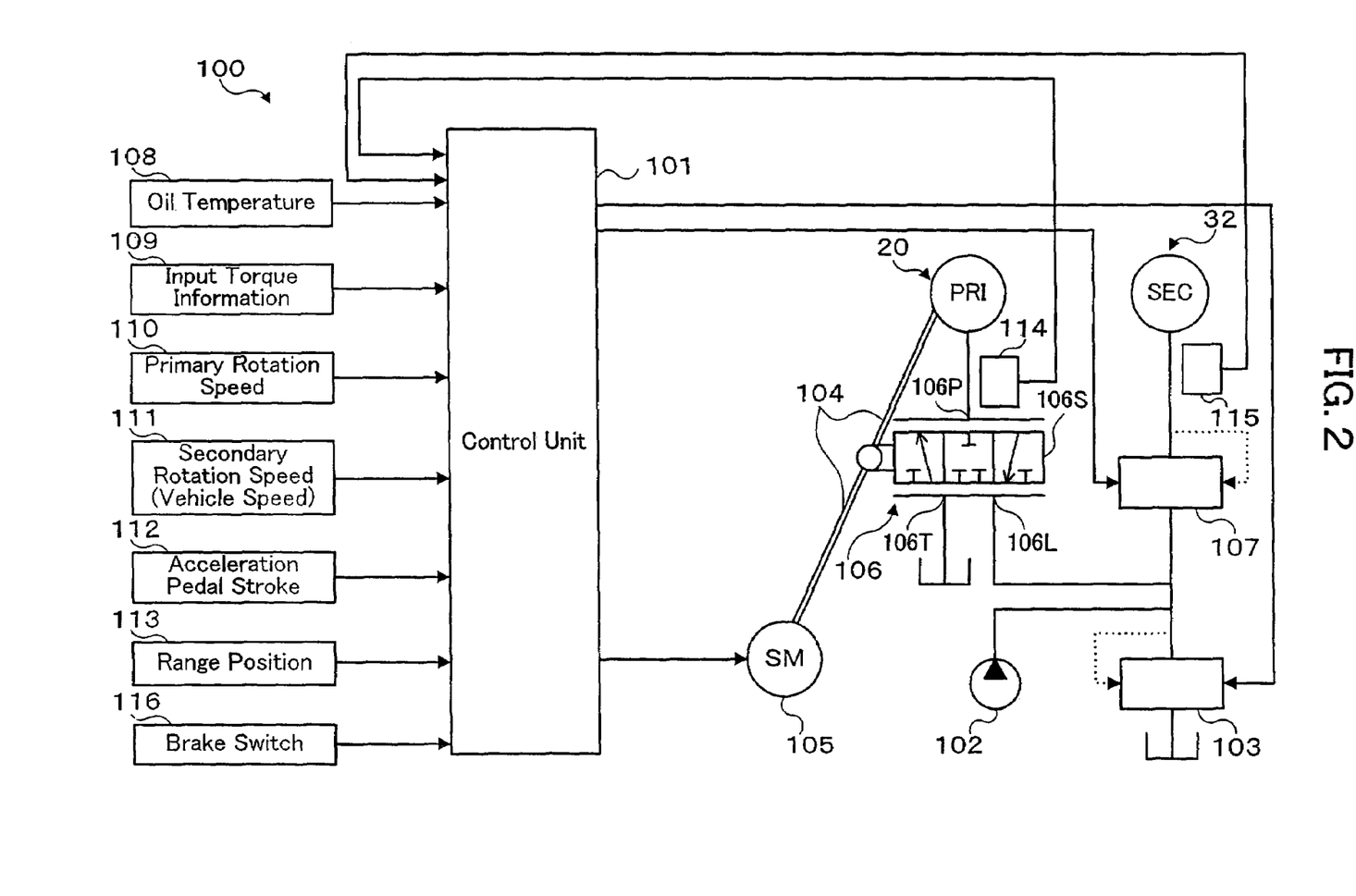
FIG. 2 is a diagram schematically showing the entire constitution of a hydraulic control unit.

FIG. 2 is a diagram schematically showing the entire constitution of a hydraulic control unit. A hydraulic control unit 100 is, to be brief, for achieving proper speed change ratio suitable to the operation conditions by controlling each hydraulic pressure (the primary pressure and the secondary pressure) of the respective cylinder chambers (the primary pulley cylinder chamber 20 and the secondary pulley cylinder chamber 32) of the above primary pulley 16 and the secondary pulley 26 thereby changing the groove width of the secondary pulley 26 and the primary pulley 16.

To achieve the above function, the hydraulic control unit 100 comprises a control unit 101 (speed change ratio control unit) that performs overall control on the hydraulic pressure system of the V-belt type continuously variable automatic transmission 29 corresponding to the operation conditions, a regulator valve 103 that controls the line pressure generated by a hydraulic pump 102 in accordance with the command signal from the control unit 101, a step motor 105 that rotates in accordance with the command signal from the control unit 101 and drives a servo link 104 to oscillate, a speed change control valve 106 that controls the primary pressure responding to the oscillation of the servo link 104, and a pressure reducing valve 107 that controls the secondary pressure in accordance with the command signal from the control unit 101. A system constitution, in which the pressure reducing valve 107 is not provided, i.e., the line pressure is used as the secondary pressure as it is, may be adopted.

The speed change control valve 106 is provided with a primary port 106P that communicates with the primary pulley cylinder chamber 20, a line pressure port 106L that supplies the line pressure, a drain port 106T and a spool 106S that switches the communication between these ports.

The spool 106S is connected with the servo link 104; both ends of the servo link 104 are connected with the step motor 105 and the moving conical plate 22 of the primary pulley 16 respectively. The position of the spool 106S is determined to anyone of the following three positions (first to third positions) depending on the oscillation position of the servo link 104, that is, the rotation angle of the step motor 105 and the groove width of the primary pulley 16.

The first position is a position where the line pressure port 106L is closed and the primary port 106P and the drain port 106T are allowed to communicate with each other. The second position is a position where the drain port 106T is closed and the primary port 106P and the line pressure port 106L are allowed to communicate with each other. The third position is a position where every port (primary port 106P, line pressure port 106L and drain port 106T) is closed.

Accordingly, the speed change control valve 106 serves as a three-positioning valve that appropriately switches among the above first to third positions using the groove width of the primary pulley 16 corresponding to the actual speed change ratio as a mechanical feedback value so that the feedback value (groove width of the primary pulley 16) serves as the target speed change ratio corresponding to the rotation amount of the step motor 105.

As described already, the control unit 101 entirely controls the hydraulic pressure system of the V-belt type continuously variable automatic transmission 29 corresponding to the operation conditions. As for the parameters representing the operation conditions, for example, oil temperature of the hydraulic pressure system of the V-belt type continuously variable automatic transmission 29, input torque from the engine 10, revolution speed of the primary pulley 16 (primary revolution speed), revolution speed of the secondary pulley 26 (secondary revolution speed or vehicle speed Vsp), depression stroke of an accelerator pedal (or throttle openings TVO), range position of an automatic transmission selector (P, N, D, 2, 1, etc), and brake operating state or the like are included. Further, the primary pressure and the secondary pressure are included.

These parameters are detected by switches and sensors, which are disposed at an appropriate position respectively. For example, the oil temperature is detected by an oil temperature sensor 108 disposed in the flow path of the line pressure; and input torque information is given in such form as fuel injection quantity, engine speed or the like from an engine control unit 109. Also, the primary revolution speed is detected by a rotation sensor 110 attached to the primary pulley 16; and the secondary revolution speed is detected by a rotation sensor 111 attached to the secondary pulley 26. Further, the depression stroke of the accelerator pedal is detected by a stroke sensor 112 attached to the accelerator pedal (not shown); the range position of the automatic transmission selector is detected by an inhibitor switch 113. Furthermore, the primary pressure is detected by a primary pressure sensor 114 provided in the primary pulley cylinder chamber 20; the secondary pressure is detected by a secondary pressure sensor 115 provided in the secondary pulley cylinder chamber 32. Further, operation and non-operation of the brakes is detected by brake switch 116 provided in the foot brake (not-illustrated).

The control unit 101 uses, for example, a microcomputer (not limited thereto), to execute a predetermined control program; thereby, as a first function, a "speed change ratio control function", in which target speed change ratio is determined corresponding to the vehicle speed or accelerator pedal stroke. The step motor 105 is driven so as to obtain the target speed change ratio to control the diameter ratio (i.e., actual speed change ratio) between the primary pulley 16 and the secondary pulley 26 is realized. Further, the control unit 101 realizes, as a second function, an "hydraulic pressure control function", in which duty cycle control of open/close of the regulator valve 103 and the pressure reducing valve 107 is made corresponding to the oil temperature, the primary pressure, the secondary pressure, the input torque, the primary revolution speed and the secondary revolution speed or the like to control the line pressure and the secondary pressure which uses the line pressure as the source pressure, thereby the thrust (force to sandwich and hold the V-belt 24) of the primary pulley 16 and the secondary pulley 26 is controlled.

Figure 4A:
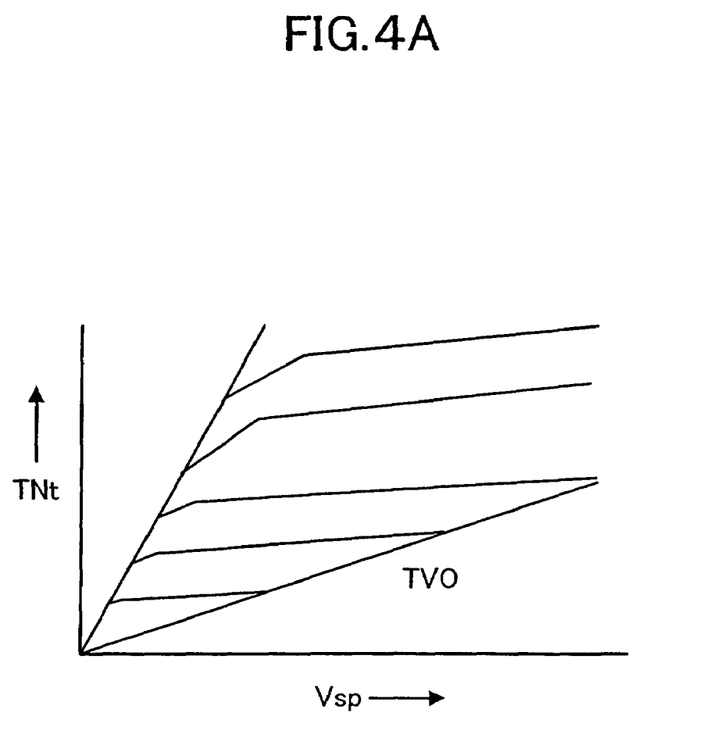
FIGS. 4A and 4B are diagrams showing a target speed change ratio map.
Figure 4B:
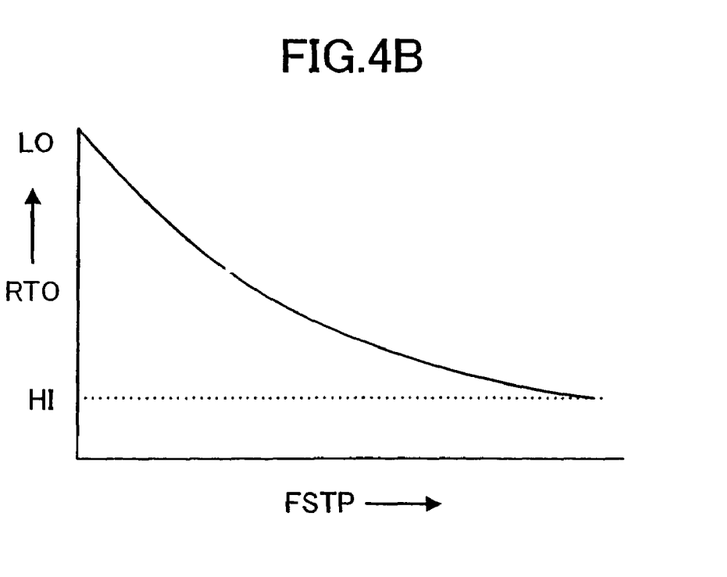
Figure 5:
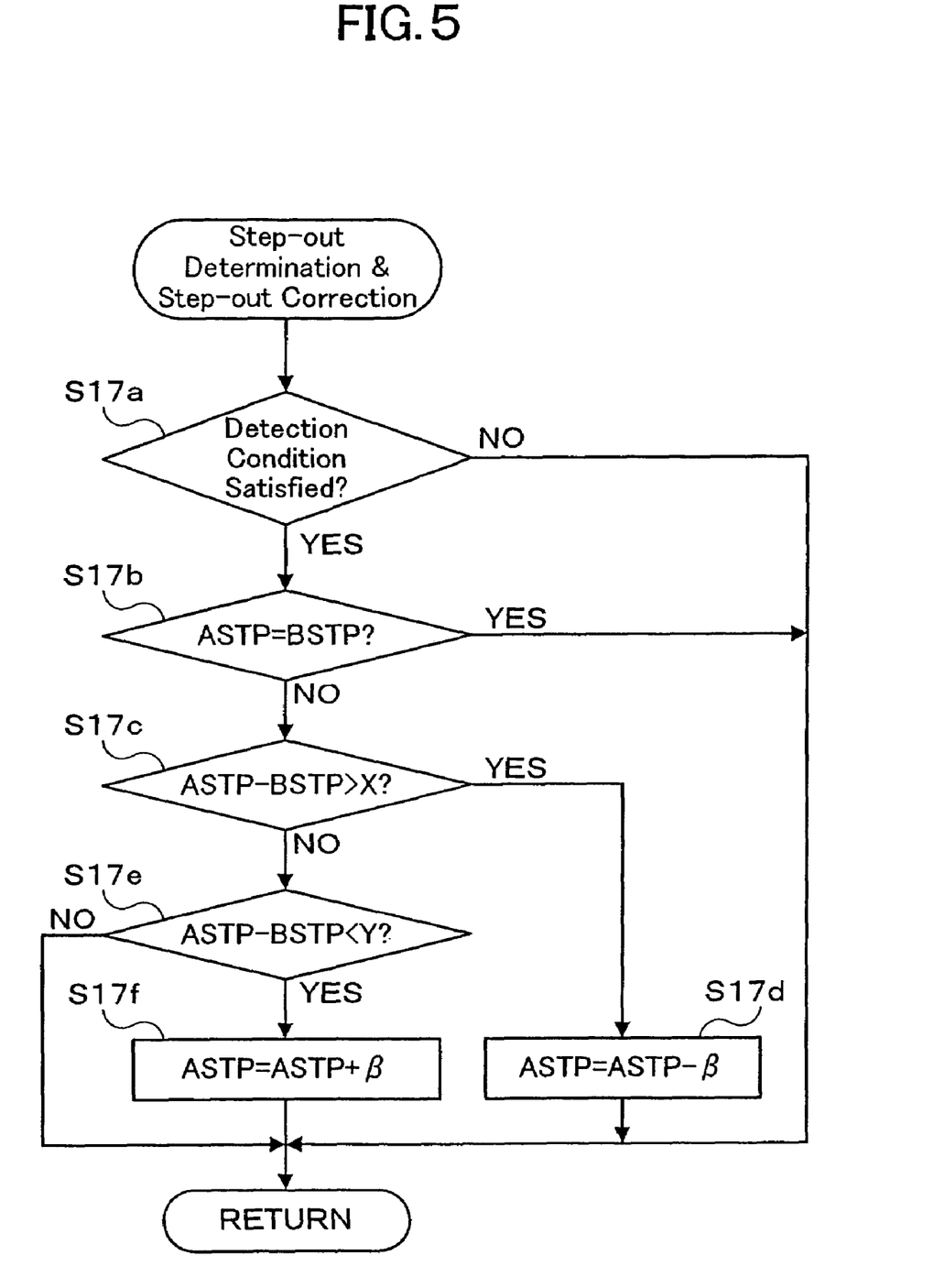
FIG. 5 is a diagram showing a flowchart (part 2) of an essential part of the control program for realizing the speed change ratio control function and the hydraulic pressure control function.
Figure 6:
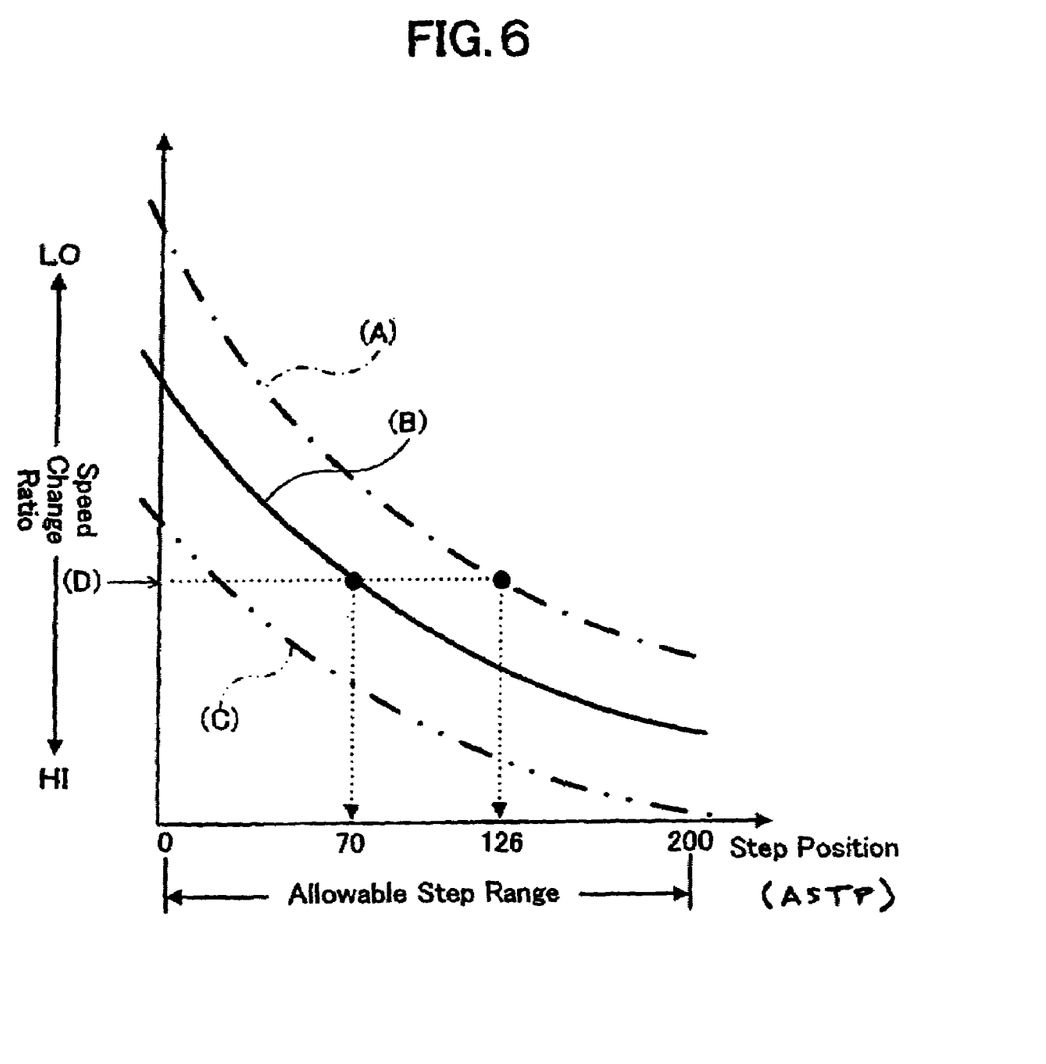
FIG. 6 is a diagram showing an ip-step characteristic map.

FIGS. 3 to 7 are the diagrams showing flowcharts of the essential part of control programs for achieving a speed change ratio control function and a hydraulic pressure control function (FIG. 3, FIG. 5 and FIG. 7) and the diagrams showing various characteristic maps appropriately used in the flowchart respectively (FIG. 4 and FIG. 6).

Hereinafter, referring to those drawings, the working of the embodiment will be described. The control programs shown are repeatedly executed at every predetermined operation cycle.

<Operation of Target Input Shaft Revolutions TNt>

Figure 3:
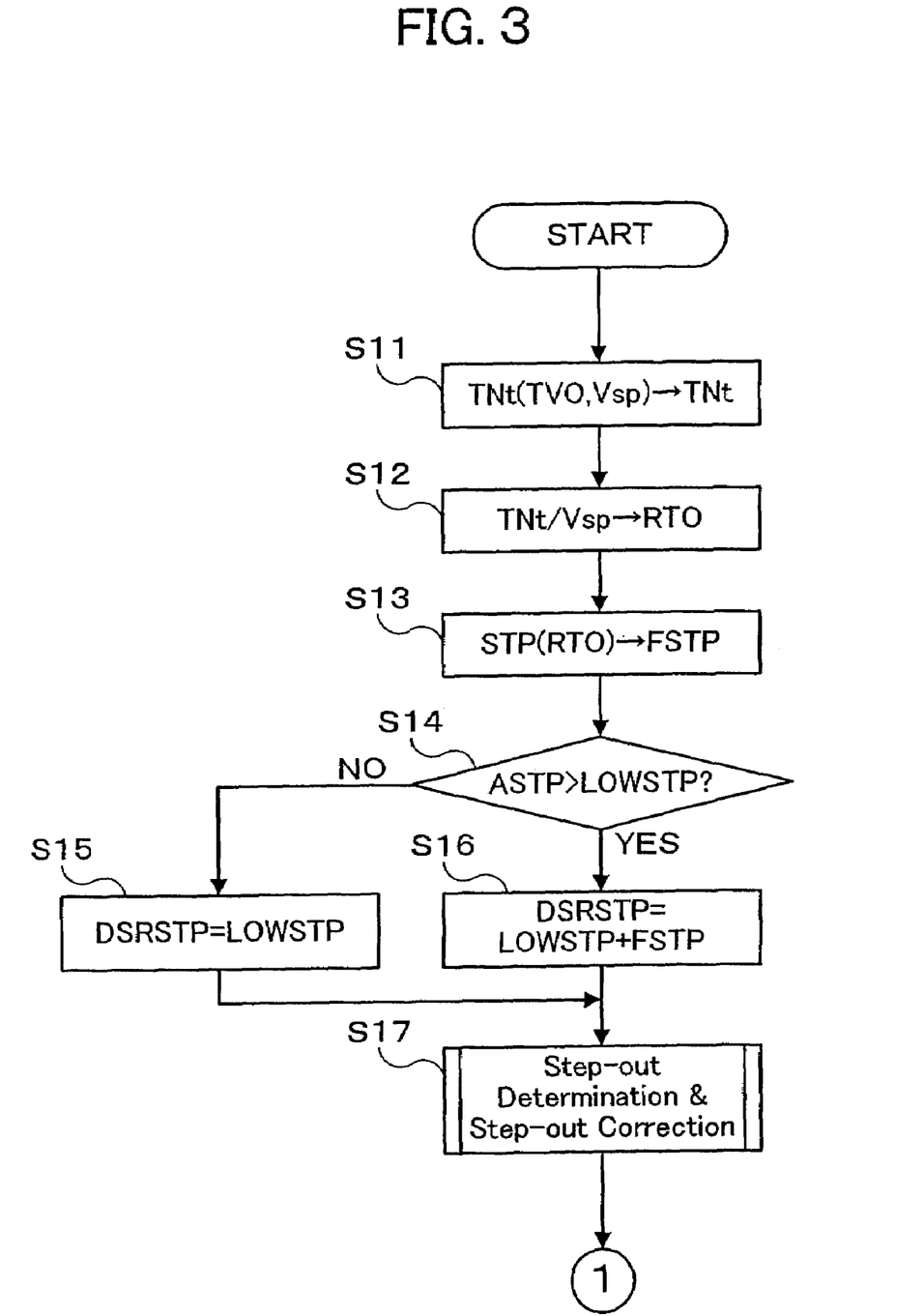
FIG. 3 is a diagram showing a flowchart (part 1) of an essential part of a control program for realizing a speed change ratio control function and a hydraulic pressure control function.

Referring to FIG. 3, first of all, the target input shaft revolutions TNt corresponding to the depression stroke (or throttle openings TVO) of the accelerator pedal and the vehicle speed Vsp is calculated (Step S11). For this operation, a target speed change ratio map shown in FIG. 4A can be used. In the target speed change ratio map shown in FIG. 4A, the vertical axis represents the target input shaft revolutions TNt, the horizontal axis represents the vehicle speed Vsp and the characteristic curves of each throttle opening TVO are provided in the map. When a random vehicle speed Vsp and throttle opening TVO are given, a characteristic curve corresponding to the TVO is selected and a target input shaft revolutions TNt corresponding to the selected characteristic curve and the Vsp is picked out.

<Operation of Target Speed Change Ratio RTO>

Then, a target speed change ratio RTO corresponding to the target input shaft revolutions TNt and the vehicle speed Vsp is acquired (Step S12).

<Operation of Transmission Step Number FSTP>

Next, a transmission step number FSTP corresponding to the target speed change ratio RTO is operated (Step S13). For this operation, a step table map shown in FIG. 4B can be used. The step table map shown in FIG. 4B has a characteristic such that, when the target speed change ratio RTO comes closer to the maximum speed change ratio (LO) side, the transmission step number FSTP of a smaller value is picked out, while when the target speed change ratio RTO comes closer to the minimum speed change ratio (HI) side, the transmission step number FSTP of a larger value is picked out and further has a non-linear characteristic such that, the alteration degree of the transmission step number FSTP at the maximum speed change ratio (LO) is larger than the alteration degree of the transmission step number FSTP at the minimum speed change ratio (HI) side.

<Setting of Target Step Number DSRSTP>

Next, a step motor output step number ASTP, which is a step position of the step motor stored in the control unit 101 and equivalent to the operation amount of the step motor, and a low position step number LOWST for the maximum speed change ratio are compared to determine whether ASTP>LOWSTP is satisfied or not (Step S14). When ASTP>LOWSTP is not satisfied, the LOWSTP is substituted for a target step number DSRSTP (Step S15), while if ASTP>LOWSTP is satisfied, a value in which LOWSTP is added with the FSTP (value operated at the step S13) (LOWSTP+FSTP) is substituted for the target step number DSRSTP (Step S16). In any case, the following "step-out determination and step-out correction" (step S17) is carried out.

<Step-Out Determination and Step-Out Correction>

Referring to FIG. 5, first, it is determined whether the step-out determination conditions are established (Step S17a). The step-out determination conditions include, for example, the following seven conditions (Conditions 1 to 7). In this embodiment, when all of these conditions are satisfied, it is determined that the step-out determination conditions have been established. However, it may be arranged in such a way that when a part of the conditions or several conditions are satisfied, it is determined that the step-out determination conditions have been established.

(Condition 1)

Acceleration or deceleration of the vehicle speed Vsp is a predetermined value or less, which is considerably smaller than the deceleration generated by an engine brake. During acceleration/deceleration, since the speed change ratio is apt to change easily, when the step-out determination is made during such-speed change ratio transition period, there is a possibility of making a misjudgment. Accordingly, by adding this condition, it is possible to detect a stable state of the speed change ratio correctly and the misjudgment can be avoided. The acceleration or deceleration is obtained by differentiating and filtering the value detected by the secondary rotation sensor 111.

(Condition 2)

The primary revolution speed is a predetermined high revolution speed, equivalent to the road load below of a predetermined high velocity revolution speed. By adding this condition, it is possible to prevent the step-out determination from being made during such operation condition that the speed change ratio is apt to change easily (speed change ratio transition period) and the misjudgment can be avoided.

(Condition 3)

The vehicle speed Vsp is within a predetermined speed range matching to cruising speed. By adding this condition, it is possible to prevent the step-out determination from being made during such operation conditions that the speed change ratio is apt to change easily (speed change ratio transition period) and the misjudgment can be avoided.

(Condition 4)

There is no alteration of the speed change ratio caused by accelerator operation, select lever operation, manual change gear switch (not shown) or the like. By adding this condition, it is possible to prevent the step-out determination from being made during such operation conditions that the speed change ratio is being altered (speed change ratio transition period) and the misjudgment can be avoided. As for the detection of the condition, it is determined whether select lever operation or a manual mode speed change is made or not based on the signal from the inhibitor switch.

(Condition 5)

The brake switch 116 is in off position (brake pedal is not being depressed). During acceleration or deceleration which is the case that braking is mostly being operated and the speed change ratio is apt to change easily, there is a possibility of making a misjudgment if the step-out determination is made during such speed change ratio transition period. Accordingly, by adding this condition, it is possible to detect a stable state of the speed change ratio correctly and the misjudgment can be avoided.

(Condition 6)

The alteration of the speed change ratio is a predetermined value or less. By adding this condition, it is possible to prevent the step-out determination from being made during such operation conditions that the speed change ratio is apt to change easily (speed change ratio transition period) and the misjudgment can be avoided. As for the determination of such state that the alteration of the speed change ratio is a predetermined value or less, it is preferred to determine in a manner such that, for example, the alteration of the speed change ratio is differentiated by the time of the target speed change ratio, which is decided based on the vehicle speed or accelerator pedal stroke, to obtain a target alteration rate of speed change with respect to time and when the target alteration rate of speed change is a predetermined value or less, it is determined that the alteration rate is in a stable state. However, it may be determined in any of the following manners.

1) The alteration amount of actual speed change ratio within a predetermined time is small. To be more particular, the evaluation result of the following formula is true: "Max (an actual speed change ratio, an actual speed change ratio of a sample proceeding by one, an actual speed change ratio of a sample proceeding by two, . . . an actual speed change ratio of a sample proceeding by n)–min (an actual speed change ratio, an actual speed change ratio of a sample proceeding by one, an actual speed change ratio of a sample proceeding by two, . . . an actual speed change ratio of a sample proceeding by n)<a predetermined value."

2) The alteration amount of target speed change ratio within a predetermined time is small. To be more particular, the evaluation result of the following formula is true: "Max (a target speed change ratio, a target speed change ratio of a sample proceeding by one, a target speed change ratio of a sample proceeding by two, . . . a target speed change ratio of a sample proceeding by n)–min (a target speed change ratio, a target speed change ratio of a sample proceeding by one, a target speed change ratio of a sample proceeding by two, . . . a target speed change ratio of a sample proceeding by n)<a predetermined value."

(Condition 7)

Oil pressure is in a state that the speed change ratio corresponding to the step motor position (ASTP) can be realized. By adding this condition, in the case that the step motor is not in the state of step-out and a speed change ratio cannot be realized due to insufficient hydraulic pressure, it is possible to prevent the step-out determination from being erroneously made and the misjudgment can be avoided. That is, even when the step motor is not in the state of step-out, in the case that the secondary pressure is generated excessively or the line pressure is insufficient, the actual speed change ratio does not become the speed change ratio corresponding to the position of the step motor (ASTP) despite that the primary pressure is the same as the line pressure. To the contrary, when the secondary pressure is insufficient, even if the primary pressure lowers to zero, speed change ratio corresponding to the position of the step motor (ASTP) is not realized. In these cases, by arranging not to make the step-out determination, it is possible to prevent the misjudgment.

The above condition is, for example, detected and determined as described below. First, it is detected whether the secondary pressure is generated in accordance with the instruction. It is determined based on that the value obtained by subtracting an actual secondary pressure detected by a secondary pressure sensor 115 from a target secondary pressure is a predetermined value (for example 0.5 MPa) or less. Also, it is detected whether the primary pressure is lower than the instructed line pressure value. It is determined based on the value obtained by subtracting an actual primary pressure detected by a primary pressure sensor 114 from the operated line pressure is a predetermined value (for example 0.5 MPa) or more. As for the means for detecting that the speed change actuator and solenoid are all normal, and that hydraulic pressure sensor is normal, known means are used to determine whether normal or failure.

Figure 7:
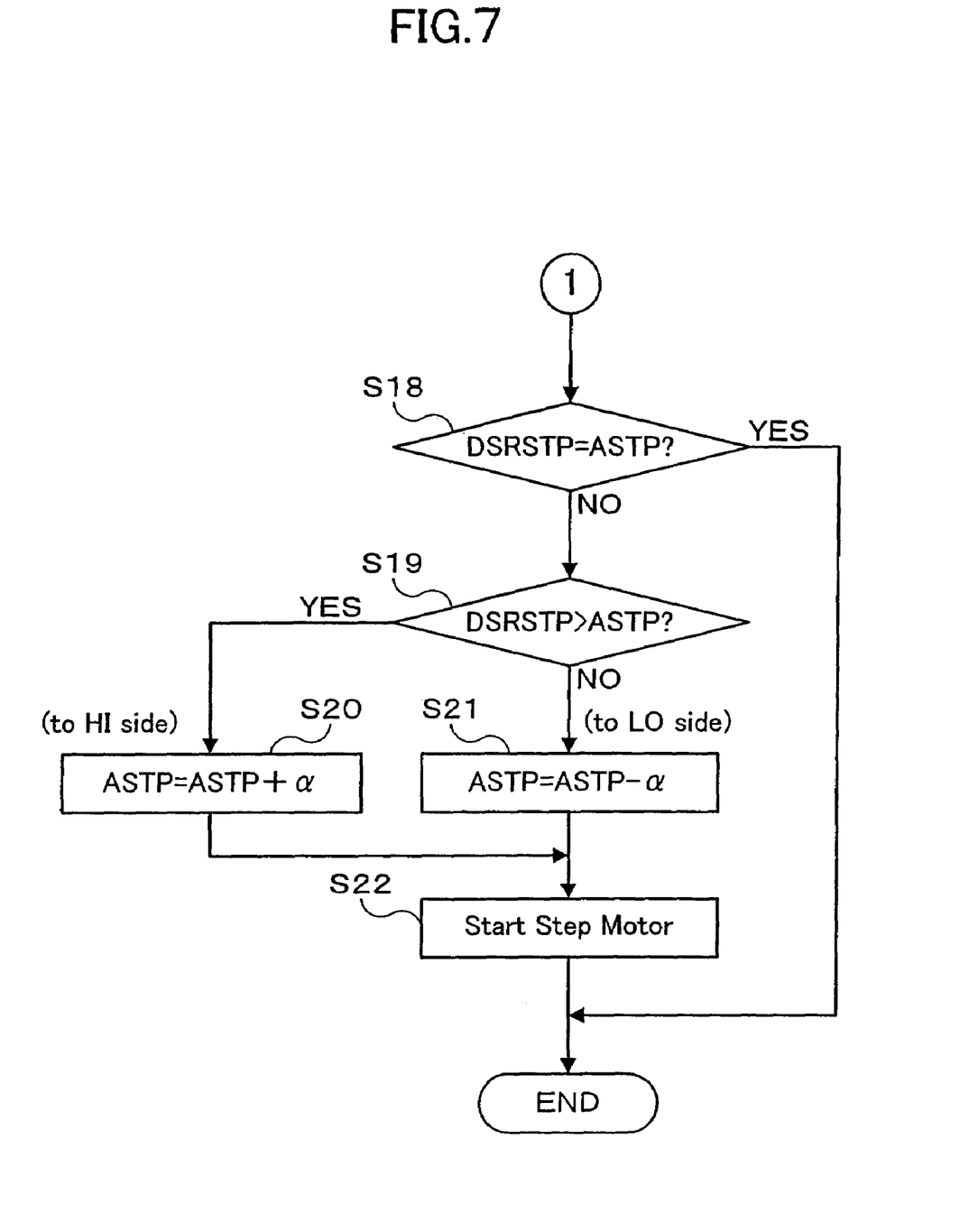
FIG. 7 is a diagram showing a flowchart (part 3) of an essential part of the control program for realizing the speed change ratio control function and the hydraulic pressure control function.

When it is determined that the step-out determination condition is not established ("NO" at the step S17a), it is determined that the system is in an inappropriate state for step-out determination (a misjudgment may be made), the following routine of step-out determination and step-out correction is skipped, and the operation proceeds to the flow shown in FIG. 7.

On the other hand, when it is determined that the step-out determination condition has been established ("YES" at the step S17a), first, it is determined whether it is ASTP=BSTP (Step S17b; step-out determination means). The ASTP represents the step position of the step motor 105 taken in the control unit 101 and the BSTP represents the step position corresponding to the stroke position of the pulley, which is determined geometrically based on the actual speed change ratio. The ASTP and the BSTP are almost identical in the case of non-step-out, and they differ largely from each other in the case of step-out.

Here, a table (ip-step characteristic map) will be described using a two-dimensional map, where the vertical axis represents speed change ratio and the horizontal axis represents step position (ASTP). Characteristic curve (B) indicated in solid line in the map is a nominal characteristic curve when no step-out has occurred on the step motor 105. Contrary to this, two characteristic curves (A and C) are the step-out characteristic curves each of which is formed by shifting the nominal characteristic curve (B) parallel to the right and left respectively. For example, when a random speed change ratio (D) is realized, in the case of nominal characteristic curve (B), an ASTP=70 is obtained; in the case of step-out characteristic curve (for example, A), an ASTP=126 is obtained. It means that a step deviation of 126−70=56 is occurred.

Controls holding such "deviation" as it is, not to mention, is not preferred. Further, depending on the actual speed change ratio, an ASTP may exceed the allowable step range. In this case, it is beyond the control any more.

The "step-out determination" according to the embodiment determines that, when the formula "ASTP=BSTP" is not satisfied (in other words, if ASTP≠BSTP) at the above step S17b, a step-out has occurred on the step motor 105. That is, when the formula "ASTP=BSTP" is satisfied, it is determined that no step-out has occurred on the step motor 105, accordingly the following "step-out correction" is skipped. On the other hand, when it is determined that a step-out has occurred on the step motor 105 (if ASTP≠BSTP), first, it is determined whether the difference (ASTP−BSTP) between the ASTP and the BSTP is a predetermined threshold value X or more (Step S17c).

When the difference (ASTP−BSTP) between the ASTP and the BSTP is a predetermined threshold value X or more, the ASTP is renewed with a value that is the ASTP subtracted by a predetermined value β (Step S17d; step-out correction means), or when the difference (ASTP−BSTP) between the ASTP and the BSTP is not a predetermined threshold value X or more, then it is determined whether the difference (ASTP−BSTP) between the ASTP and the BSTP is smaller than a predetermined threshold value Y (Step S17e). When the difference (ASTP−BSTP) between the ASTP and the BSTP is smaller than a predetermined threshold value Y, the ASTP is renewed by a value that is the ASTP added with a predetermined value β (Step S17d; step-out correction means). In either case, the operation proceeds to the processing flow in FIG. 7.

<Operation of Step Motor Drive>

Referring to the processing flow in FIG. 7, first, it is determined whether it is DSRSTP=ASTP, i.e., whether the step position of the step motor 105 matches a target step position (Step S18). If DSRSTP=ASTP, since the step position of the step motor 105 matches the target step position, it is determined that it is not necessary to drive the step motor 105, and the flowchart is terminated.

On the other hand, if it is not DSRSTP=ASTP, it is determined whether it is DSRSTP>ASTP. That is, it is determined whether the step position of the step motor 105 is positioned closer to the LO-side than the target step position (Step S19), if DSRSTP>ASTP, in order to drive the step motor 105 to the direction of the HI-side, the ASTP is renewed with a value that is the ASTP added with a predetermined value α (Step S20), or if it is not DSRSTP>ASTP, in order to drive the step motor 105 to the direction of the LO-side, the ASTP is renewed with a value that is the ASTP subtracted by a predetermined value α (Step S21). In any case, after driving the step motor 105 based on the ASTP. (Step S22; drive means), the flowchart is terminated.

As described above, according to the embodiment, the processing flow of the "step-out determination and step-out correction" at the step S17 is made at every operation cycle, and when it is not ASTP=BSTP, it is possible to determine that a step-out has occurred on the step motor 105.

Accordingly, being completely different from the case of the prior art such that "unless the spool of the speed change control valve is not positioned at a specific position corresponding to the maximum speed change ratio;" i.e., "when the actual speed change ratio is at a speed change ratio other than the maximum speed change ratio, the control unit does not utterly serve as the step-out preventive measures," it is possible to make the step-out determination of the step motor 105 at every operation cycle at any speed change ratio, and further, it is possible to obtain such particular effect that, when a step-out is detected, the deviation of ASTP caused by the step-out can be corrected (Step S17f, Step S17d).

While the present invention has been described with reference to the preferred embodiments, it is our intention that the invention be not limited by any of the details of the description thereof.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are intended to be embraced by the claims.

What is claimed is:

1. A speed change ratio control unit for a continuously variable transmission which converts input rotation into output rotation in continuously changing speed manner through controlling a step motor that is a driving actuator for a speed change control valve, said speed change ratio control unit comprising:

a computing device for generating a command signal to control said step motor;

storage for storing a step position ASTP of said step motor corresponding to said command signal;

an input rotation detection means for detecting said input rotation;

an output rotation detection means for detecting said output rotation;

an actual speed change ratio calculation means that calculates actual speed change ratio from said input rotation detected and said output rotation detected;

a step-out determination means which compares said step position ASTP of said step motor stored by said storage and a step position BSTP of said step motor corresponding to said calculated actual speed change ratio at every predetermined operation cycle, and if ASTP≠BSTP is satisfied determines that a step-out has occurred on said step motor in which a synchronization between said command signal and said calculated actual speed change ratio is lost;

a step-out correction means that when the step-out is determined by said step-out determination means corrects said ASTP so as to reduce a difference between said ASTP and BSTP; and a drive means for driving said step motor using said corrected ASTP.

2. The speed change ratio control unit for a continuously variable transmission according to claim 1, wherein said step-out determination means determines the step-out of said step motor when a step-out determination condition that hydraulic pressure is in a state capable of realizing a speed change ratio corresponding to said step position ASTP of said step motor stored in said speed change ratio control unit which satisfies a step-out determination criterion.

3. The speed change ratio control unit for a continuously variable transmission according to claim 1, wherein said step-out determination means determines the step-out of said step motor when a step-out determination condition that an alteration of the speed change ratio is a predetermined value or less which satisfies a step-out determination criterion.

4. The speed change ratio control unit for a continuously variable transmission according to claim 1, wherein said step-out determination means determines the step-out of said step motor when a step-out determination condition that the acceleration or deceleration of said step motor is a predetermined value or less which satisfies a step-out determination criterion.

5. The speed change ratio control unit for a continuously variable transmission according to claim 1, wherein said step-out determination means determines the step-out of said step motor when a step-out determination condition that braking is not being operated which satisfies a step-out determination criterion.

6. The speed change ratio control unit for a continuously variable transmission according to claim 1, wherein said step-out determination means determines the step-out of said step motor when a step-out determination condition that a lever is not being operated by a driver which satisfies a step-out determination criterion.

7. The speed change ratio control unit for a continuously variable transmission according to claim 1, wherein said determination means makes said determination when the conditions set forth below are satisfied:
 hydraulic pressure is in a state capable of realizing a speed change ratio corresponding to a step position ASTP of said step motor stored in said speed change ratio control unit is satisfied, on an occasion of step-out determination,
 an alteration of the speed change ratio is a predetermined value or less which satisfies a step-out criterion,
 acceleration or deceleration is a predetermined value or less which satisfies a step-out criterion,
 braking is not being operated which satisfies a step-out criterion, and
 that a lever is not being operated by a driver which satisfies a step-out criterion.

8. A speed change ratio control unit for a continuously variable transmission for controlling a step motor for a drive actuator of a speed change control valve in said speed change ratio control unit of said continuously variable transmission which changes gears without going through stages and makes input rotation into output rotation, comprising:
 a computing device for generating a command signal to control said step motor;
 storage for storing a step position ASTP of said step motor corresponding to said command signal;
 an input rotation detection means for detecting said input rotation;
 an output rotation detection means for detecting said output rotation;
 an actual speed change ratio from said detected input rotation and output rotation;
 a step-out determination means for determining at every predetermined operation cycle said speed change ratio control unit which compares said step position ASTP of said step motor stored in said storage with said computed actual speed change ratio which corresponds to a step position BSTP of said step motor when ASTP≠BSTP and a step-out arises in said step motor in which a synchronization between said command signal and said calculated actual speed change ratio is lost;
 a step-out correction means for correcting said ASTP in the direction which lessens the difference of said ASTP and BSTP when said step-out is determined by said step-out determination means; and
 a drive means for driving said step motor using ASTP after said step-out correction.

9. The speed change ratio control unit for a continuously variable transmission according to claim 8, wherein said step-out determining means determines the step-out of said step motor when said speed change ratio control unit is in said step position ASTP of said step motor which corresponds to a speed change ratio which is in a state of realizable hydraulic pressure which satisfies a step-out criterion of said step-out.

10. The speed change ratio control unit for a continuously variable transmission according to claim 8, wherein said step-out determining means determines the step-out of said step motor when a lever operation is not being performed by a driver which satisfies a step-out criterion of said step-out.

11. The speed change ratio control unit for a continuously variable transmission according to claim 8, wherein said step-out determining means determines when the following conditions are satisfied:
 hydraulic pressure is in a state capable of realizing a speed change ratio corresponding to said step position ASTP of said step motor stored in said speed change ratio control unit is satisfied, on an occasion of a step-out determination,
 an alteration of the speed change ratio is a predetermined value or less which satisfies a step-out criterion,
 acceleration or deceleration is a predetermined value or less which satisfies a step-out criterion,
 braking is not being operated which satisfies a step-out criterion, and
 that a lever is not being operated by a driver which satisfies a step-out criterion.

12. The speed change ratio control unit for a continuously variable transmission according to claim 8, wherein said step-out determining means determines the step-out of said step motor when a brake operation is not being performed which satisfies a step-out criterion of said step-out.

13. A speed change ratio control unit for a continuously variable transmission for controlling a step motor for a drive actuator of a speed change control valve in said speed change ratio control unit of said continuously variable transmission which changes gears without going through stages and makes input rotation into output rotation, comprising:
 a computing device for generating a command signal to control said step motor;
 storage for storing a step position ASTP of said step motor corresponding to said command signal;
 an input rotation detection means for detecting said input rotation;
 an output rotation detection means for detecting said output rotation;
 an actual speed change ratio from said detected input rotation and output rotation;
 a step-out determination means for determining at every predetermined operation cycle said speed change ratio control unit which compares said step position ASTP of said step motor stored in said storage with said computed actual speed change ratio which corresponds to a step position BSTP of said step motor when ASTP≠BSTP and a step-out arises in said step motor in which a synchronization between said command signal and said calculated actual speed change ratio is lost, wherein said step-out determining means determines the step-out of said step motor when a change of a speed change ratio results in a state below a predetermined value which satisfies a step-out criterion of said step-out;

a step-out correction means for correcting said ASTP in the direction which lessens the difference of said ASTP and BSTP when said step-out is determined by said step-out determination means; and a drive means for driving said step motor using ASTP after said correction.

14. A speed change ratio control unit for a continuously variable transmission for controlling a step motor for a drive actuator of a speed change control valve in said speed change ratio control unit of said continuously variable transmission which changes gears without going through stages and makes input rotation into output rotation, comprising:

a computing device for generating a command signal to control said step motor;

storage for storing a step position ASTP of said step motor corresponding to said command signal;

an input rotation detection means for detecting said input rotation;

an output rotation detection means for detecting said output rotation;

an actual speed change ratio from said detected input rotation and output rotation;

a step-out determination means for determining at every predetermined operation cycle said speed change ratio control unit which compares said step position ASTP of said step motor stored in said storage with said computed actual speed change ratio which corresponds to a step position BSTP of said step motor when ASTP≠BSTP and a step-out arises in said step motor in which a synchronization between said command signal and said calculated actual speed change ratio is lost, wherein said step-out determining means determines the step-out of said step motor when the acceleration or deceleration of said step motor is below a predetermined value which satisfies a step-out criterion of said step-out;

a step-out correction means for correcting said ASTP in the direction which lessens the difference of said ASTP and BSTP when said step-out is determined by said step-out determination means; and a drive means for driving said step motor using ASTP after said correction.

* * * * *